United States Patent
Fu et al.

(10) Patent No.: US 6,272,597 B1
(45) Date of Patent: Aug. 7, 2001

(54) DUAL-PORTED, PIPELINED, TWO LEVEL CACHE SYSTEM

(75) Inventors: John Wai Cheong Fu, Saratoga; Dean A. Mulla, San Jose; Gregory S. Mathews, Santa Clara; Stuart E. Sailer, Campbell, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,847

(22) Filed: Dec. 31, 1998

(51) Int. Cl.[7] .................................................. G06F 12/10
(52) U.S. Cl. .................... 711/131; 711/122; 711/128; 711/129; 711/205; 711/207
(58) Field of Search ................................... 711/119, 120, 711/122, 129, 117, 128, 131, 3, 204, 205, 207; 714/42

(56) References Cited

U.S. PATENT DOCUMENTS

| | | | |
|---|---|---|---|
| 5,023,776 | * | 6/1991 | Gregor ................................. 711/122 |
| 5,442,766 | * | 8/1995 | Chu et al. ............................ 711/204 |
| 5,742,790 | * | 4/1998 | Kawasaki ............................ 711/128 |
| 5,930,819 | * | 7/1999 | Hetherington et al. ............. 711/131 |
| 6,044,478 | * | 3/2000 | Green .................................. 714/42 |
| 6,065,091 | * | 5/2000 | Green .................................. 711/3 |
| 6,101,579 | * | 8/2000 | Randolph et al. ................... 711/131 |

OTHER PUBLICATIONS

Farrens et al., "A Partitioned Translation Lookaside Buffer Approach to Reducing Address Bandwidth", May 1992, p. 435.*

* cited by examiner

Primary Examiner—B. James Peikari
Assistant Examiner—Brian R. Peugh
(74) Attorney, Agent, or Firm—Schwegman, Lundberg, Woessner & Kluth, P.A.

(57) ABSTRACT

A novel on-chip cache memory and method of operation are provided which increase microprocessor performance. The on-chip cache memory has two levels. The first level is optimized for low latency and the second level is optimized for capacity. Both levels of cache are pipelined and can support simultaneous dual port accesses. A queuing structure is provided between the first and second level of cache which is used to decouple the faster first level cache from the slower second level cache. The queuing structure is also dual ported. Both levels of cache support non-blocking behavior. When there is a cache miss at one level of cache, both caches can continue to process other cache hits and misses. The first level cache is optimized for integer data. The second level cache can store any data type including floating point. The novel two-level cache system of the present invention provides high performance which emphasizes throughput.

29 Claims, 6 Drawing Sheets

DUAL-PORTED, PIPELINED, TWO LEVEL CACHE SYSTEM

FIELD OF THE INVENITON

The present invention relates generally to the field of electronic data processing devices. More particularly, the present invention relates to cache memories.

BACKGROUND OF THE INVENTION

Many computer systems today use cache memories to improve the speed of access to more frequently used data and instructions. A small cache memory may be integrated on a microprocessor chip itself, thus, greatly improving the speed of access by eliminating the need to go outside the microprocessor chip to access data or instructions from an external memory.

During a normal data load accessing routine, the microprocessor will first look to an on-chip cache memory to see if the desired data or instructions are resident there. If they are not, the microprocessor will then look to an off-chip memory. On-chip memory, or cache memory, is smaller than main memory. Multiple main memory locations may be mapped into the cache memory. The main memory locations, or addresses, which represent the most frequently used data and instructions get mapped into the cache memory. Cache memory entries must contain not only data, but also enough information ("tag address and status" bits) about the address associated with the data in order to effectively communicate which external, or main memory, addresses have been mapped into the cache memory. To improve the percentage of finding the memory address in the cache (the cache "hit ratio") it is desirable for cache memories to be set associative, e.g., a particular location in memory may be stored in multiple ways in the cache memory.

Most previous cache designs, because of their low frequency, can afford a relatively large cache, e.g. a cache which contains both integer data and larger floating point data. However, as microprocessor frequencies and instruction issue width increase, the performance of on-chip cache system becomes more and more important. In cache design, low latency and high capacity requirements are incompatible. For example, a cache with a low latency access usually means the cache has a small capacity. Conversely, a large cache means the cache has a long access latency.

For the reasons stated above, and for other reasons stated below which will become apparent to those skilled in the art upon reading and understanding the present specification, it is desirable to develop improved performance for on-chip cache memory.

SUMMARY OF THE INVENTION

A novel cache memory and method of operation are provided which increases microprocessor performance. In one embodiment, the cache memory has two levels. The first level cache has a first address port and a second address port. The second level cache similarly has a first address port and a second address port. A queuing structure is coupled between the first and second level of cache. In another embodiment, a method for accessing a cache memory is provided. The method includes providing a first virtual address and a second virtual address to a first translation look aside buffer and a second translation look aside buffer in a first level of the cache memory. The method further includes providing the first virtual address and the second virtual address to a translation look aside buffer in a second level of the cache memory. Providing the first virtual address and the second virtual address to the first level and the second level of the cache memory occurs in a first processor clock cycle. A first cache hit/miss signal corresponding to the first virtual address is provided through a queuing structure to an arbitrator in the second level of the cache memory after a second processor clock cycle.

DETAILED DESCRIPTION

A novel cache memory which provides improved caching is provided. In the following detailed description numerous specific details are set forth in order to provide a thorough understanding of the invention. However, it will be understood by those skilled in the art that the present invention may be practiced without these specific details. In other instances well known methods, procedures, components, and circuits have not been described in detail so as not to obscure the present invention.

Figure 1:
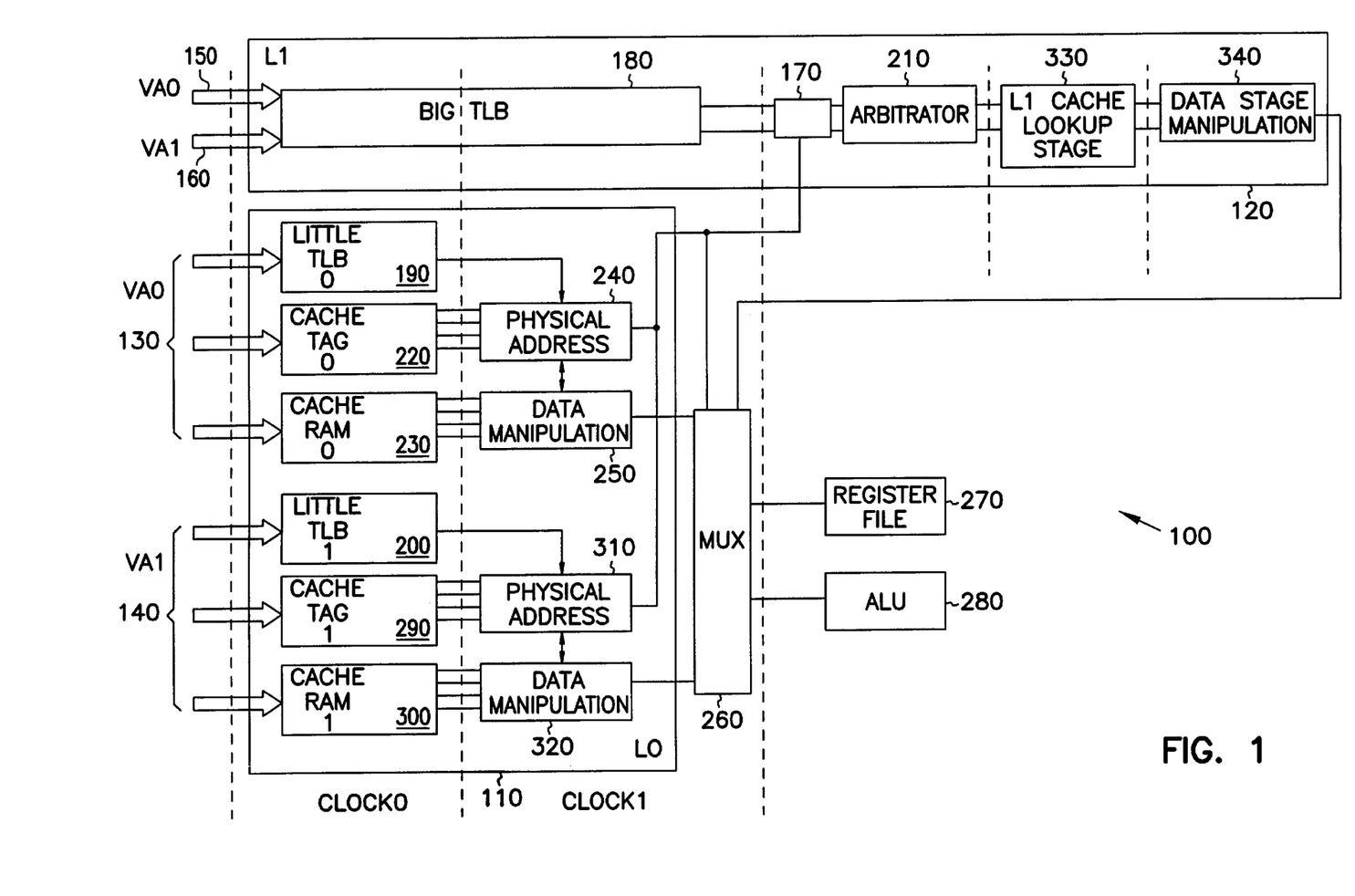
FIG. 1 is a block diagram illustrating an embodiment of a cache memory according to the teachings of the present invention.

FIG. 1 is a block diagram illustrating an embodiment of a cache memory 100 according to the teachings of the present invention. FIG. 1 illustrates that the cache memory 100 includes a first level (L0), of cache memory 110 and a second level (L1) of cache memory 120. The first level of cache memory 110, L0, is also referred to in this specification as first level cache 110. The second level of cache memory 120, L1, is also referred to in this specification as second level cache 120. The first level cache 110 is designed to have a low data load access latency. In one embodiment, the first level cache 110 contains only integer data in order to provide low load access latency. Data access to the first level cache 110 is completed in two clock cycles. The second level cache 120 has a larger capacity than the first level cache 110 and contains floating point data as well as integer data. Accordingly, the second level cache 120 has a longer load access latency that the first level cache 110. The first level cache 110 and the second level cache 120 are dual ported. As FIG. 1 illustrates, the first level cache 110 has a first address port 130 and a second address port 140. The second level cache 120 has a first address port 150 and a second address port 160. A queuing structure 170 is coupled between the first cache level 110 and the second cache level 120. The queuing structure 170 of the present invention comprises logic circuitry which is structured to achieve the stated objectives of the present invention. One of ordinary skill in the art of microprocessor cache architecture will understand, upon reading this disclosure, the various manner in which such logic circuitry may be configured.

As shown in FIG. 1, a virtual address is provided to each of the address ports, 130, 140, 150 and 160 respectively. In one embodiment, the first address port 130 for the first level cache 110 receives a first virtual address, or virtual address for a first memory address, VA 0, and the second address port 140 for the first level cache 110 simultaneously receives a second virtual address, VA 1. In one embodiment, the first address port 150 for the second level cache 120 receives a first virtual address, VA 0, and the second address port 160 for the second level cache 110 simultaneously receives a second virtual address, VA 1.

FIG. 1 further illustrates that the first level cache 110 has a first translation look aside buffer 190 and a second translation look aside buffer 200. The first translation look aside buffer 190 is coupled to the first address port 130 of the first level cache 110 to receive a first virtual address, VA 0. The second translation look aside buffer 200 is coupled to the second address port 140 of the first level cache 110 to receive a second virtual address, VA 1. In one embodiment, each translation look aside buffer, 190 and 200, of the first level cache 110 includes at least 32 entries. In one embodiment, the first translation buffer 190 and the second translation buffer 200 are the same physical translation buffer which is dual ported. Both the first translation buffer 190 and the second translation buffer 200 are coupled through a physical address comparator, 240 and 310 respectively, and through a queuing structure 170 to an arbitrator 210 in the second level cache 120. The queuing structure 170 is designed to couple first level cache hit/miss signals from physical address comparators, 240 and 310 respectively and the physical addresses from the translation look aside buffer 180, to the arbitrator 210. In another implementation, a translation look aside buffer 180, shown in FIG. 1 in the second level cache 120, does not exist. In this implementation, physical addresses are coupled from first translation buffer 190 and the second translation buffer 200 to the arbitrator 210 through the queuing structure 170. The first level cache hit/miss signals from the physical address comparators, 240 and 310 respectively, also go through the queuing structure 170 and to the arbitrator 210. The arbitrator 210 includes logic circuitry to interpret the first level cache hit/miss signals. The logic circuitry within the arbitrator 210 is structured to achieve the intended function of the present invention. One of ordinary skill in the art of will understand, upon reading this disclosure, the various manner in which such logic circuitry may be configured.

The first level cache 110 further includes a first cache TAG 220 associated with the first translation buffer 190. The first cache TAG 220 supplies address information ("tag address and status" bits) for the first virtual address, VA 0. A first cache RAM 230 is included which similarly supplies data for the first memory request. A cache lookup for the memory request is completed in the first level cache 110 in a first clock cycle. In a second clock cycle, the physical address from the first translation buffer 190 is compared with the cache TAG 220 physical address data in the physical address comparator 240 to indicate a cache hit/miss and way. This information is used in the data manipulation block 250, and also sent to the queuing structure 170. The data manipulation block 250 contains logic circuitry for way selecting, aligning and bi-endian swapping the cache RAM data output. One of ordinary skill in the art will understand from reading this disclosure the various manner in which these functions may be performed and organized as part of the data manipulation block 250. As shown in FIG. 1, a multiplexor 260 is coupled to the data manipulation block 250. The multiplexor 260 is further coupled to a functional unit such as register file 270 and to an arithmetic logic unit (ALU) 280. In one embodiment, the multiplexor 260 includes routing circuitry capable of directing manipulated data sets to the desired location, e.g. a register file 270 or an ALU 280. One of ordinary skill in the art of microprocessor cache architecture will understand, upon reading this disclosure, the various manner in which routing circuitry may be configured.

As illustrated in FIG. 1, the first level cache 110 further includes a second cache TAG 290 associated with the second translation buffer 190. In one embodiment, the first cache TAG 220 and the second cache TAG 290 are part of the same physical TAG array which is dual ported (i.e. allows two simultaneous load accesses to be performed even to the same entry). The second cache TAG 220 supplies address information ("tag address and status" bits) for the second virtual address, VA 1. A second cache RAM 300 is included which similarly supplies data for the second memory request. In one embodiment, cache RAM 230 and cache RAM 300 are part of the same physical data array which is dual ported. A cache lookup for the memory request is completed in the first level cache 110 in a first clock cycle. In a second clock cycle, the physical address from the second translation buffer 200 is compared with the second cache TAG 290 physical address data in the physical address comparator 310 to indicate a cache hit/miss and way. The cache hit/miss and way information is used in the data manipulation block 320 and also sent to the queuing structure 170. The data manipulation block 320 contains logic circuitry for way selecting, aligning and bi-endian swapping the cache RAM data output. One of ordinary skill in the art will understand from reading this disclosure the various manner in which these functions may be performed and organized as part of the data manipulation block 250. As shown in FIG. 1, a multiplexor 260 is coupled to the data manipulation block 320. The multiplexor 260 is further coupled to functional units such as register file 270 and an arithmetic logic unit (ALU) 280. In one embodiment, the multiplexor 260 includes routing circuitry capable of directing manipulated data sets to the desired location, e.g. a register file 270 or an ALU 280.

A translation look aside buffer 180 is also shown in the second level cache 120 of FIG. 1. In one embodiment, the translation look aside buffer 180 of the second level cache 120 has at least 96 entries. In this embodiment, the translation look aside buffer 180 is adapted to simultaneously receive a first virtual address, VA 0, and a second virtual address, VA 1, from the first address port 140 and the second address port 150, respectively, at the second level cache 120. In this embodiment, the second level cache 120 is a banked dual port. That is, the second level cache can facilitate two simultaneous cache load accesses even to the same cache line so long as those cache accesses are not to the same bank. The translation look aside buffer 180 of the second level cache 120 is coupled to the arbitrator 210 through the queuing structure 170. The arbitrator 210 is coupled to a cache lookup stage 330 in the second level cache 120. One of ordinary skill in the art will understand, upon reading this disclosure, the various manner in which the cache lookup stage 330 may be configured to accomplish cache lookup. The second cache lookup stage 330 is further coupled to a data manipulation stage 340 in the second level cache 120. Data manipulation stage 340 contains logic circuitry for way selecting, aligning and bi-endian swapping retrieved cache RAM data output. One of ordinary skill in the art will understand from reading this disclosure the manner in which these functions may be performed and organized as part of the data manipulation block 340. The data manipulation stage 340 of the second level cache 120 is coupled to the multiplexor 260 discussed above. As detailed above, the multiplexor 260 includes routing circuitry capable of directing manipulated data sets to the desired location, e.g. a register file 250 or an ALU 260.

In one embodiment, the first address port 130 for the first level cache 110 and the first address port 150 for the second level cache 120 are adapted to simultaneously receive a first virtual address, VA 0. In this embodiment, the first level cache 110 and the second cache level 120 are adapted to simultaneously, e.g. in parallel, initiate a cache lookup for the first virtual address, VA 0, in a first clock cycle. In this embodiment, the first level cache 110 is adapted to complete the cache lookup for the first virtual address, VA 0 in a first clock cycle. The queuing structure 170 is adapted to couple a first level hit/miss signal for the first virtual address, VA 0, from the physical address comparator 240 in the first level cache 110 to the arbitrator 210 to the second level cache 120 such that the first level hit/miss signal is provided to the arbitrator 210 after a second clock cycle. If the first level hit/miss signal for the first virtual address, VA 0, signals to the arbitrator 210 that the first cache data corresponding to the first virtual address, VA 0, is available (a cache "hit") in the first level cache 110, then the arbitrator discontinues the cache lookup of the first virtual address, VA 0, in the second level cache 120. Alternatively, if the first level hit/miss signal for the first virtual address, VA 0, signals to the arbitrator 210 that the first cache data corresponding to the first virtual address, VA 0, is unavailable (a cache "miss") in the first level cache 110, then the arbitrator allows the cache lookup, or data access, of the first virtual address, VA 0, to proceed forward in the second level cache 120 pipeline. If the cache lookup of the first virtual address, VA 0, is a cache "hit" in the second level cache 120 a data set is provided to the data manipulation stage 340 in the second level cache 120. At the next stage in the second level cache 120, manipulated data sets are forwarded to the multiplexor 260 presented above.

In another embodiment, the second address port 140 for the first level cache 110 and the second address port 160 for the second level cache 120 are adapted to simultaneously receive a second virtual address, VA 1. In this embodiment, the first level cache 110 and the second cache level 120 are adapted to simultaneously initiate a cache lookup for the second virtual address, VA 1, in a first clock cycle. In this embodiment, the first level cache 110 is adapted to complete the cache lookup for the second virtual address, VA 1, in a first clock cycle. The queuing structure 170 is adapted to couple a first level hit/miss signal for the second virtual address, VA 1, from the physical address comparator 310 in the first level cache 110 to the arbitrator 210 in the second level cache 120 such that the first level hit/miss signal is provided to the arbitrator 210 after a second clock cycle. If the first level hit/miss signal for the second virtual address, VA 1, signals to the arbitrator 210 that the second virtual address, VA 1, is a cache "hit" in the first level cache 110, then the arbitrator 210 discontinues the cache lookup of the second virtual address, VA 1, in the second level cache 120. Alternatively, if the first level hit/miss signal for the second virtual address, VA 1, signals to the arbitrator 21,0 that the second virtual address, VA 1, is a cache "miss" in the first level cache 110, then the arbitrator 210 allows the cache lookup, or data access, of the second virtual address, VA 1, to proceed forward in the second level cache 120. If the cache lookup of the second virtual address, VA 1, is a cache "hit" in the second level cache 120 a data set is provided to the data manipulation stage 340 in the second level cache 120 and on to the multiplexor 260, as discussed above. In one embodiment, the queuing structure is adapted to simultaneously provide a first level hit/miss signal for the first virtual address, VA 0, and a first level hit/miss signal for the second virtual address, VA 1, to the arbitrator 210.

The first level cache 110 is designed for integer data retrieval. That is, in one embodiment, the allocation policy for the two-level cache system of the present invention only stores integer data in the first level cache 110, and the data manipulation logic is only designed to handle integer data sizes and alignment. As stated, in one embodiment the first translation look aside buffer 190 and the second translation look aside buffer 200 have 32 entries. Meanwhile, a second level cache 120 is provided with the ability to handle integer and floating point data retrieval from the cache memory 100. The data manipulation stage 340 in the second level cache 120 is larger than the data manipulation blocks, 250 and 320, in the first level cache 110 in order to handle both integer data and floating point data. The present invention is designed reduce the latency For the integer data retrieval while still maintaining floating point throughput and capacity since the integer data latency is more important to overall microprocessor performance. One embodiment of the present invention does not slow down integer data retrieval to make floating point data return faster but still maintains floating point throughput and capacity.

In one embodiment of the present invention, the novel two-level structure with its queuing structure 170 maintains -a higher pipelined throughput of cache data while reducing circuit complexity and fabrication costs. Integer data located in the first level cache 110 can be accessed within two clock cycles. In contrast, other approaches to low latency cache design use a small capacity cache for large data types, like floating point data, which results in a reasonably high cache "miss" rate for floating point data. In one embodiment of the present invention, only integer data is contained in the first level cache 110.

In one embodiment, the design of the first level cache 110 is a true dual ported cache for facilitating high throughput with a small cache capacity. In this embodiment, the first level cache 110 is not a banked dual port and has a smaller cache line size (32 bytes) than the larger second level cache. The first level cache 110 has a smaller cache line size to maximize the number of different memory locations which may be contained within the first level cache 110 while still allowing for a reasonable performance benefit due to data locality. The first level cache 110 is not a banked cache in order to avoid the incidence of bank conflicts. Here, the incidence of bank conflicts would be otherwise fairly high due to the first level cache's 110 handling of a 32 byte cache line size. Again, in this embodiment, the first level cache 110 handles integer data. If the first level cache 110 receives an integer data request it performs a cache lookup on the integer data address, determines whether it has a cache "hit" or "miss" within a first clock cycle and signals this result to the queuing structure 170.

The second level cache 120 has a larger capacity than the first level cache 110. In one embodiment, the second level cache 120 is a banked dual port and may have bank conflicts. In this embodiment, banking is chosen since a true dual ported structure at the second level cache 120 would be significantly more expensive on account of the larger cache capacity. Using an 8 byte bank size (accesses greater than 8 bytes use two banks simultaneously) and a 64 byte cache line size, banking the second level cache 120 is not likely to cause bank conflicts. However, if the second level cache 120 does receive two simultaneous load accesses to the same bank, it will place one data access (typically the second data access) in the queuing structure 170 and execute on the other (typically the first data access). In a following clock cycle the second level cache 120 can either retrieve and execute on the data access which was placed on hold in the queuing structure 170, or the second level cache 120 can execute on a new data access which was a cache "miss" in the first level cache 110. Thus, in the novel two-level cache system of the present invention, high throughput is emphasized.

Figure 2:
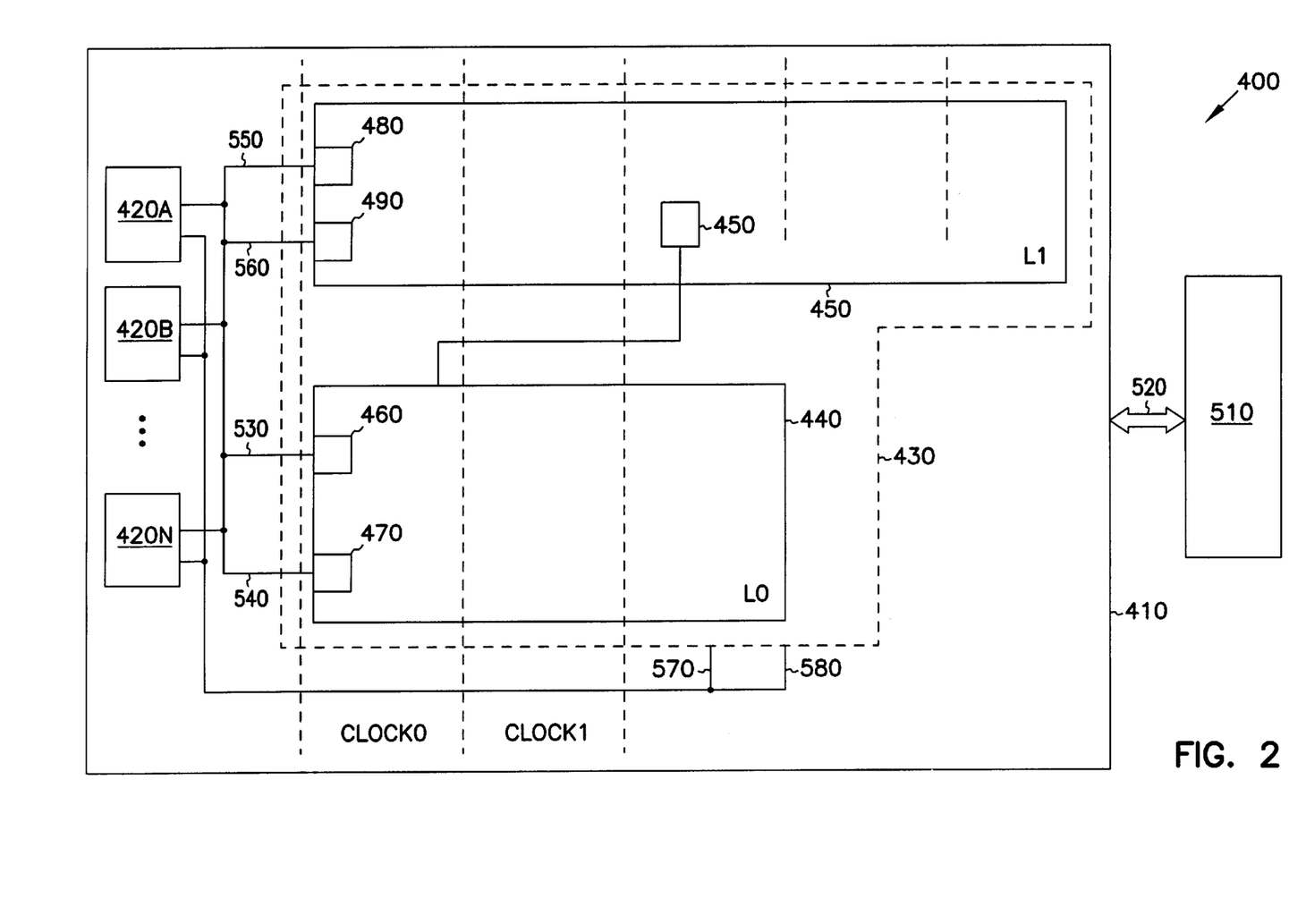
FIG. 2 is a block diagram illustrating an embodiment of a computer system according to the teachings of the present invention.

FIG. 2 is a block diagram illustrating an embodiment of a computer system 400 according to the teachings of the present invention. FIG. 2 illustrates that the computer system 400 includes a microprocessor chip 410 which is operated according to a processor clock. The microprocessor is capable of decoding and executing a computer program such as an application program or operating system with instruction sets. In one embodiment, the microprocessor is capable of decoding and executing a computer program such as an application program or operating system with instructions from multiple instruction sets. The microprocessor chip 410 includes a number of execution units, shown as 420A, 420B . . . , 420N. The microprocessor chip includes an on-chip cache memory 430. The on-chip cache memory 430 includes the two-level cache structure explained in connection with FIG. 1. As explained in connection with FIG. 1 the on-chip cache memory 430 includes a first level cache (LO) 440 and a second level cache (L1) 450. The first level cache 440 has a first address port 460 and a second address port 470. The second level cache 450 has a first address port 480 and a second address port 490. The on-chip cache memory 430 includes a queuing structure 500 which couples between the first level cache 440 and the second level cache 450. The computer system 400 further includes an off-chip memory 510. The off-chip memory 510 can include dynamic random access memory (DRAM), static random access memory (SRAM), flash type memory, or other alternative memory types. The computer system 400 includes a bus 520 which couples the off-chip memory 510 to the microprocessor chip 410. The bus 520 can include a single bus or a combination of multiples buses. As an example, bus 520 can comprise an industry standard architecture (ISA) bus, an extended industry standard architecture (EISA) bus, a system bus, an x-bus, a ps/2 bus, a peripheral components interconnect (PCI) bus, a personal computer memory card international association (PCMCIA) bus, or other buses. Bus 520 can also comprise combinations of any buses.

In one embodiment, the first level cache 440 has at least two address buses, 530 and 540 respectively, which couple the first address port 460 and the second address port 470 at any given clock cycle to two independent execution units from among the number of execution units, 420A, 420B . . . , 420N. In one embodiment, the second level cache 450 has at least two address buses, 550 and 560 respectively, which couple the first address port 480 and the second address port 490 of the second level cache 450 at any given clock cycle to two independent execution units from among the number of execution units, 420A, 420B . . . , 420N.

In one embodiment, the on-chip c(ache memory 430 has at least two data buses, 570 and 580, which couple data sets between the on-chip cache memory 430 and two independent execution units from among the number of execution units, 420A, 420B . . . , 420N.

Figure 3:
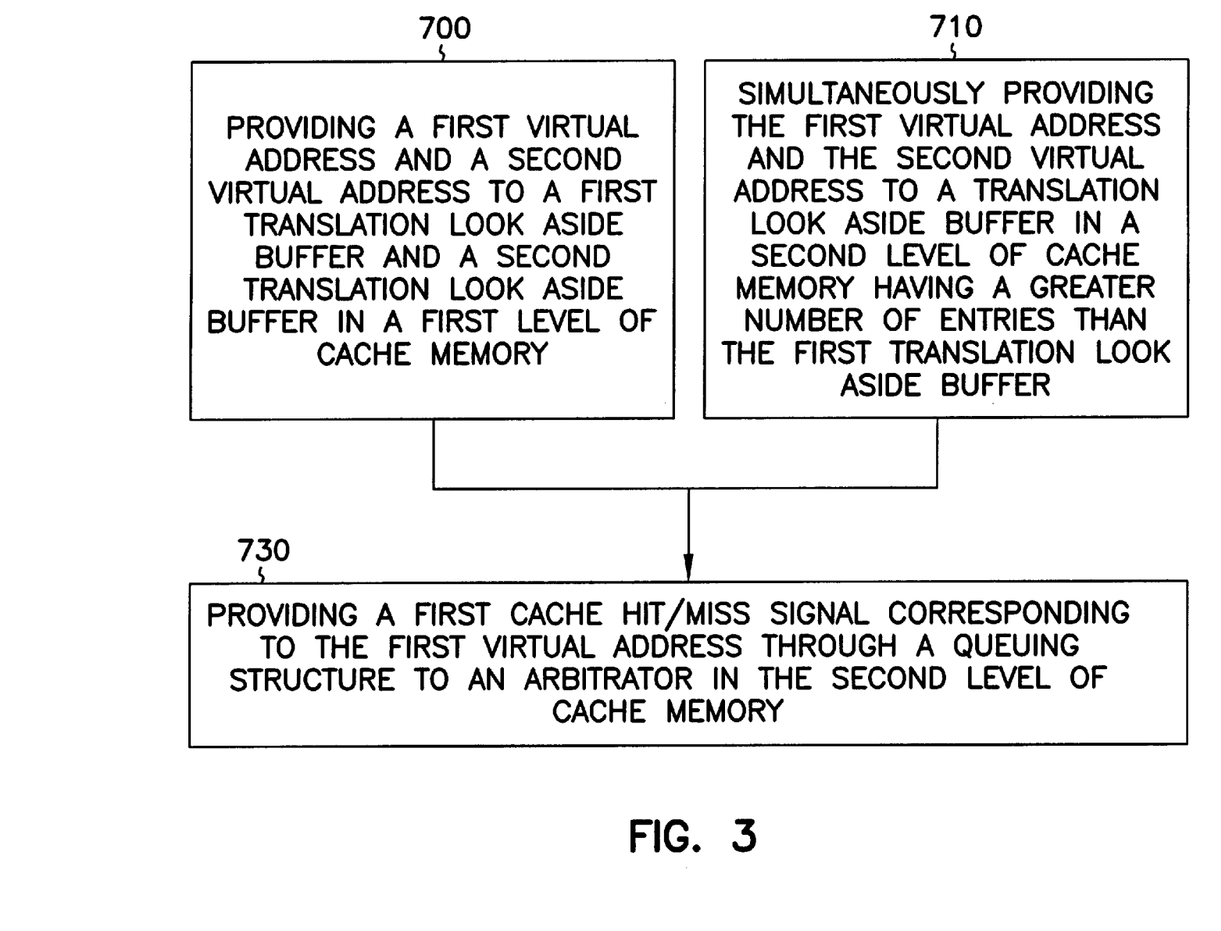
FIG. 3 illustrates, in flow diagram form, a method for load accessing a two-level cache memory according to the teachings of the present invention.

FIG. 3 illustrates, in flow diagram form, a method for load accessing a two-level cache memory according to the teachings of the present invention. As shown in FIG. 3 the method includes providing a first virtual address and a second virtual address to a first translation look aside buffer (TLB0) and a second translation look aside buffer (TLB1) in a first level (L0) of the cache memory 700. Each translation look aside buffer contains at least 32 entries. The method includes simultaneously providing the first virtual address and the second virtual address to a translation look aside buffer containing at least 96 entries in a second level (L1) of the cache memory 710. Providing the first virtual address and the second virtual address to the first level (L0) and the second level (L1) occurs in a first processor clock cycle. A first cache hit/miss signal corresponding to the first virtual address is provided through a queuing structure to an arbitrator in the second level (L1) of the cache memory after a second processor clock cycle 730.

In one embodiment of FIG. 3, providing a first cache hit/miss signal corresponding to the first virtual address to the arbitrator in the second level (L1) of the cache memory after a second processor clock cycle further includes simultaneously providing a second cache hit/miss signal corresponding to the second virtual address through the queuing structure to the arbitrator in the second level (L1) of the cache memory.

Figure 4:
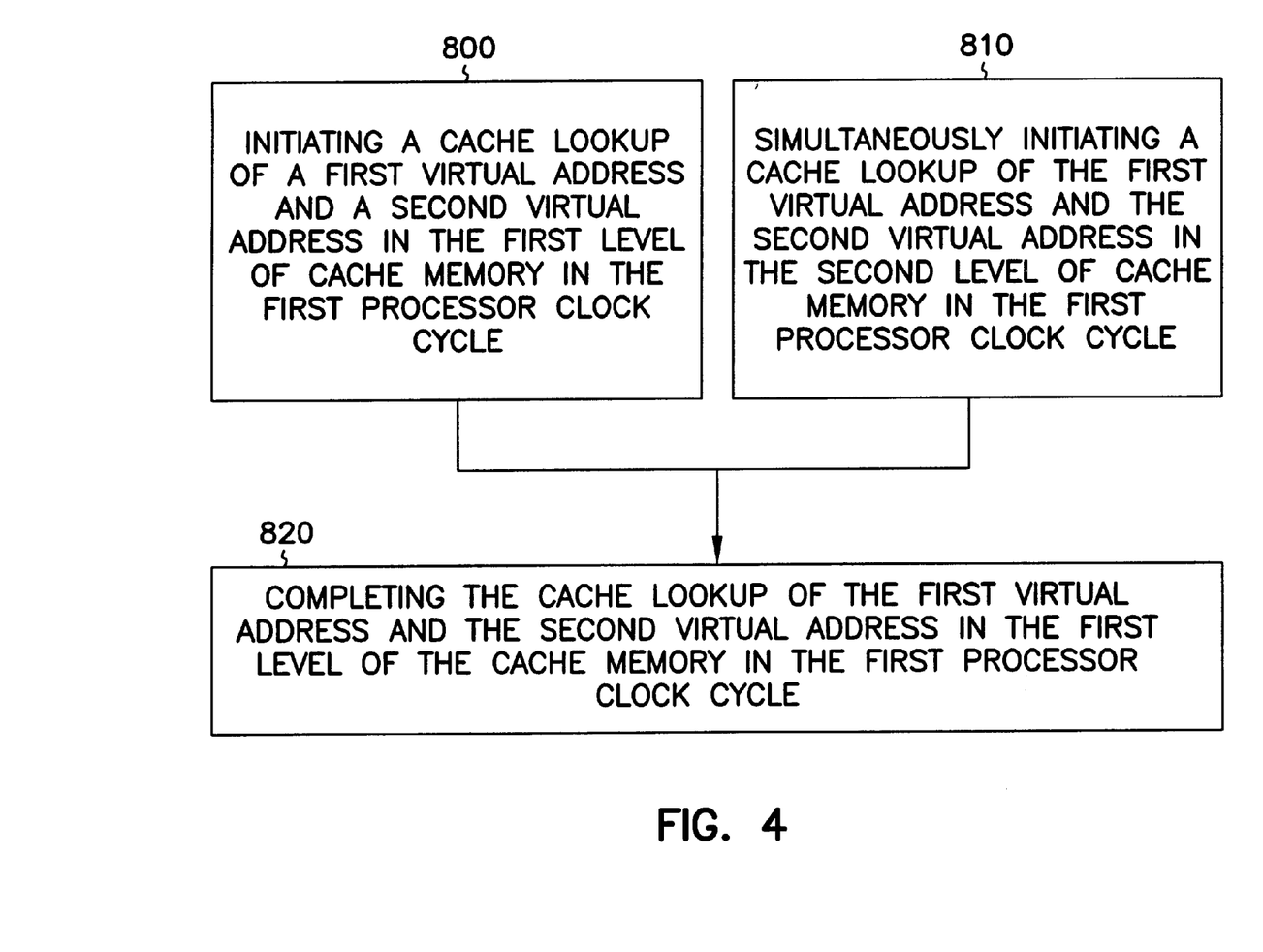
FIG. 4 illustrates, in flow diagram form, a more detailed embodiment for load accessing a two-level cache memory according the teachings of the present invention.

FIG. 4 illustrates, in flow diagram form, another method for load accessing a two-level cache memory according to the teachings of the present invention. As shown in FIG. 4 the method includes initiating a cache lookup of a first virtual address and a second virtual address in the first level (L0) of the cache memory in the first processor clock cycle 800. The method includes simultaneously initiating a cache lookup of the first virtual address and the second virtual address in the second level (L1) of the cache memory in the first processor clock cycle 810. The method further includes completing the cache lookup of the first virtual address and a second virtual address in the first level (L0) of the cache memory in the first processor clock cycle 820.

In one embodiment, the method of FIG. 4 further includes manipulating a data set representing a cache hit for the first virtual address in the first level (L0) of the cache memory in a second processor clock cycle and outputting the data set in the second processor clock cycle. In one embodiment, outputting the data set in the second processor clock cycle includes sending the data set to an arithmetic logic unit (ALU). In an alternative embodiment, outputting the data set in the second processor clock cycle includes sending the data set to a register file.

In one embodiment, the method of FIG. 4 further includes manipulating a data set representing a cache hit for the second virtual address in the first level (L0) of the cache memory in a second processor clock cycle. In this embodiment, the method includes providing one or more data set(s) from the first level (L0) of the cache memory to a multiplexor (MUX). The multiplexor provides routing priority to the data set(s) from the first level (L0) of the cache memory and data set(s) from the second level (L1) of the cache memory within the second processor clock cycle.

Figure 5:
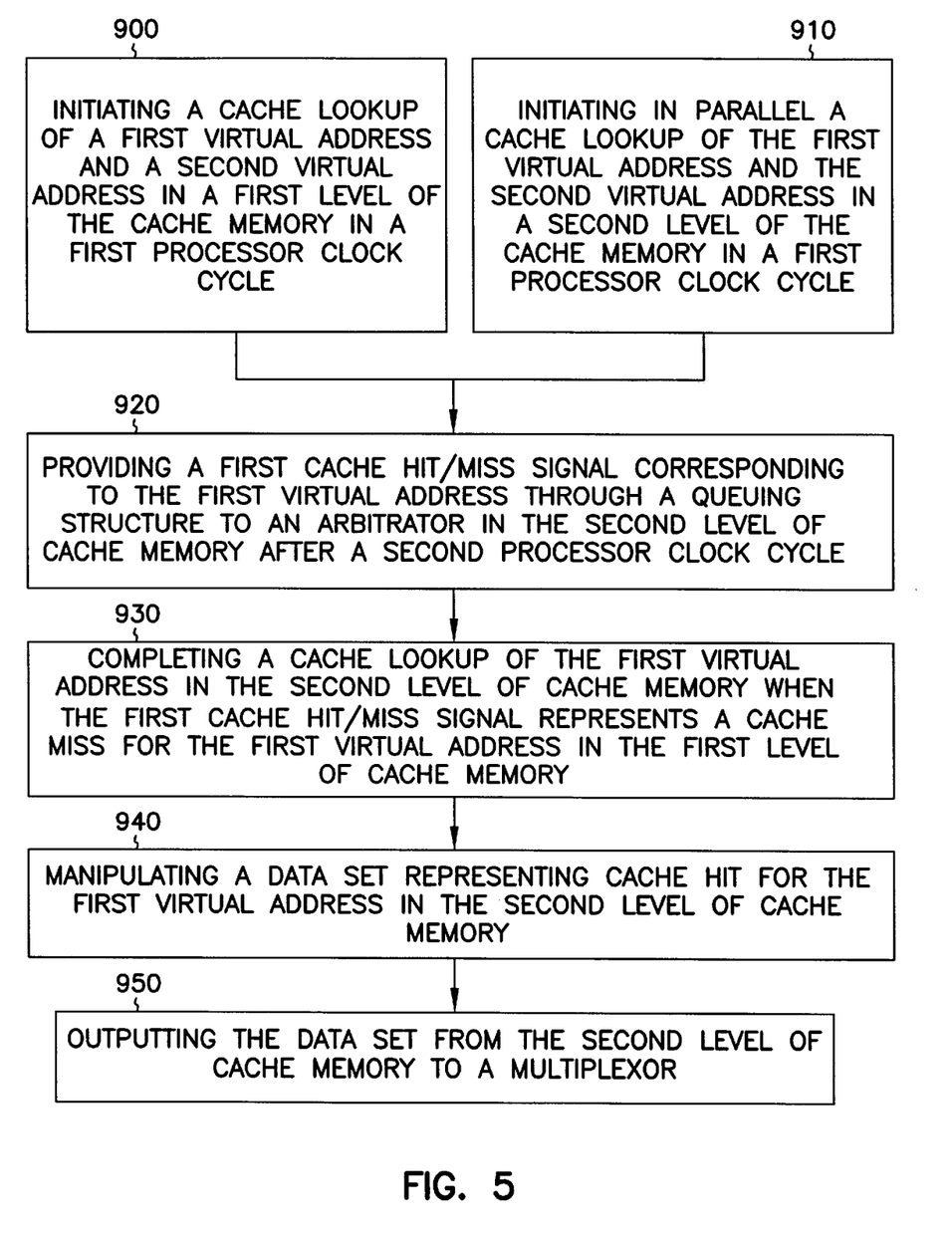
FIG. 5 illustrates, in flow diagram form, another method for load accessing a two-level cache memory according to the teachings of the present invention.

FIG. 5 illustrates, in flow diagram form, another method for load accessing a two-level cache memory according to the teachings of the present invention. As shown in FIG. 5, the method includes initiating a cache lookup of a first virtual address and a second virtual address in a first level (L0) of the cache memory in a first processor clock cycle 900. The method includes initiating, in parallel, a cache lookup of the first virtual address and the second virtual address in a second level (L1) of the cache memory in the first processor clock cycle 910. A first cache hit/miss signal corresponding to the first virtual address is provided through a queuing structure to an arbitrator in the second level (L1) of the cache memory after a second processor clock cycle 920. A cache lookup of the first virtual address is continued in the second level (L1) of cache memory when the first cache hit/miss signal represents a cache miss for the first virtual address in the first level (L0) of the cache memory 930. The method includes manipulating a data set representing a cache hit for the first virtual address in the second level (L1) of the cache memory 940. Likewise, a second cache hit/miss signal corresponding to the second virtual address is provided through the queuing structure to the arbitrator in the second level (L1) of the cache memory after a second processor clock cycle. A cache lookup of the second virtual address is continued in the second level (L1) of cache memory when the second cache hit/miss signal represents a cache miss for the second virtual address in the first level (L0) of the cache memory. The method includes manipulating a data set representing a cache hit for the second virtual address in the second level (L1) of the cache memory. The data set(s) from the second level (L1) of the cache memory is output to a multiplexor, wherein the multiplexor controls the routing priority given to data set(s) from the first level (L0) of the cache memory and the data set(s) from the second level (L1) of the cache memory 950.

In one embodiment, the method of FIG. 5 includes giving routing priority to the data set from the second level (L1) of the cache memory and re-directing a data set from the first level (L0) of the cache memory through the second level (L1) of the cache memory. In another embodiment, the method of FIG. 5 includes giving routing priority to the data set from the second level (L1) of the cache memory and forcing the first level (L0) of cache memory to act as if it has a cache miss for a data set from the first level (L0) of the cache memory (i.e. letting the L1 perform the data access which the L0 would have completed, regardless of whether the L0 was a cache hit or miss). In another alternative embodiment, where data sets from the L1 and L0 are being simultaneously returned to the same recipient, the L0 access is stalled until the L1 access is returned. In one embodiment, manipulating a data set representing a cache hit for the first virtual address in the second level (L1) of the cache memory includes manipulating in parallel a second data set representing a cache hit for the second virtual address in the second level (L1) of the cache memory.

Figure 6:
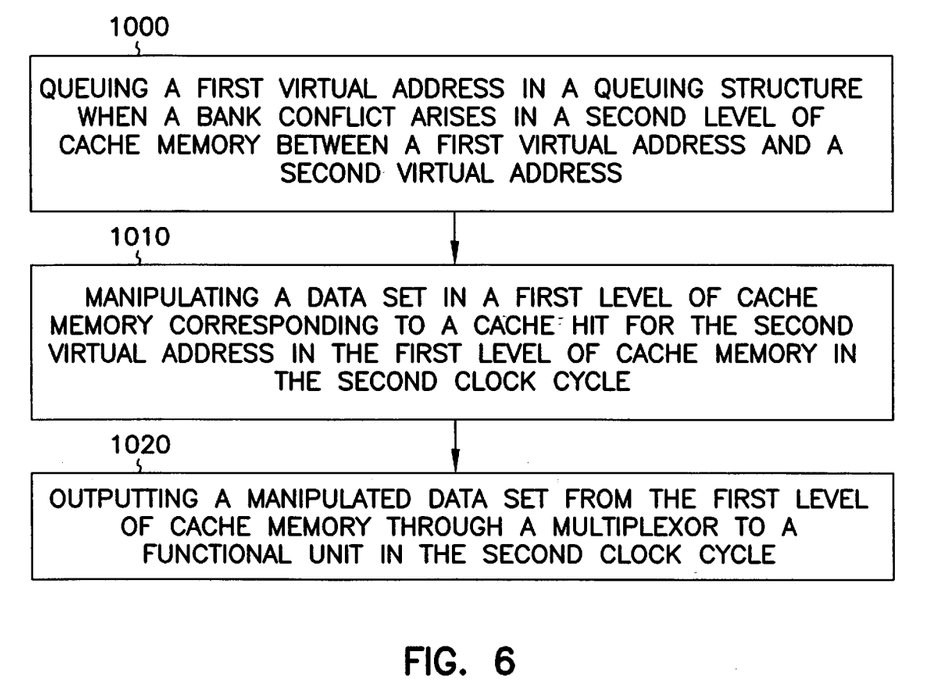
FIG. 6 illustrates, in flow diagram form, another method for load accessing a two-level cache memory according to the teachings of the present invention.

FIG. 6 illustrates, in flow diagram form, another method for load accessing a two-level cache memory according to the teachings of the present invention. As shown in FIG. 6, the method includes queuing a first virtual address in a queuing structure when a bank conflict arises in a second level (L1) cache between a first virtual address and the second virtual address 1000. In one embodiment, queuing, the first virtual address in the queuing structure when a bank conflict arises in the second level (L1) cache between the first virtual address and the second virtual address includes queuing the hit/miss signal representing, a first level cache miss for the second virtual address in the first level (L0) of cache memory. The method of FIG. 6 further includes manipulating a data set from a first level (L0) of cache memory corresponding, to a cache hit for the second virtual address in the first level (L0) of the cache memory in the second clock cycle 1010. A manipulated data set from first level (L0) of cache memory is; output through a multiplexor to a functional unit in the second clock cycle 1020. Throughout this specification a first virtual address and a second virtual address are stipulated. In one embodiment, the first virtual address and the second virtual address are virtual addresses. In an alternate embodiment, the first virtual address and the second virtual address can have a different number of bits comprising the first virtual address and the second virtual address.

The present invention provides a novel two-level cache system in which the first level is optimized for low latency and the second level is optimized for capacity. Both levels of cache can support dual port accesses occurring simultaneiously and pipelined accesses. Between the first arid second level of cache a queuing structure is provided which is used to decouple the faster first level cache from the slower second level cache. The queuing structure is also dual ported. Both levels of cache support non-blocking behavior. When there is a cache miss at one level of cache, both caches can continue to process other cache hits and misses. The first level cache is optimized for integer data. The second level cache can store any data type including floating point. The novel two-level cache system of the present invention provides high performance which emphasizes throughput.

What is claimed is:

1. A cache memory, comprising:
   an on-chip first level cache having a first address port and a second address port, wherein the first cache level includes a first translation look aside buffer and a second translation look aside buffer each having a number of entries, and wherein the first translation look aside buffer and the second translation look aside buffer simultaneously receive a first virtual address from the first address port and a second virtual address from the second address port, respectively;
   an on-chip second level cache having a first address port and a second address port; and
   a queuing structure coupling the first level cache and the second level cache.

2. The cache memory of claim 1, wherein the first level cache and the second level cache simultaneously receive a 64 bit virtual address at each one of the first and second address ports, respectively.

3. The cache memory of claim 2, wherein the first address port and the second address port for the second level cache simultaneously receive a first virtual address and a second virtual address.

4. The cache memory of claim 1, wherein the first level cache contains only integer data, and wherein the second level cache includes integer and floating point data.

5. The cache memory of claim 1, wherein the first address port for the first level cache and the first address port for the second level cache simultaneously receive a first virtual address, and wherein the first level cache and the second level cache initiate a cache lookup for the first virtual address in a first clock cycle.

6. The cache memory of claim 5, wherein the first level cache memory completes the cache lookup for the first virtual address in a first clock cycle, and wherein the queuing structure signals a first level cache hit/miss for the first virtual address to the second level cache after a second clock cycle.

7. A microprocessor chip having a processor clock signal, comprising:
   a number of execution units;
   an on-chip cache memory including a first level cache and a second level cache having at least two address buses coupled between the on-chip cache memory and the number of execution units, and a queuing structure which is coupling the first level cache and the second level cache;

at least two data buses coupled between the on-chip cache memory and the number of execution units, and wherein the first cache level includes a first translation look aside buffer and a second translation look aside buffer each having a number of entries, and wherein the first translation look aside buffer and the second translation look aside buffer simultaneously receive a first virtual address from the first address port and a second virtual address from the second address port, respectively.

8. The microprocessor chip of claim 7, wherein the second level cache is a banked cache, and wherein the queuing structure queues a second level cache bank conflict.

9. The microprocessor chip of claim 7, wherein the queuing structure queues a second level cache bank conflict and a first level cache miss.

10. The microprocessor chip of claim 7, wherein the first level cache and the second level cache simultaneously initiate a cache lookup for a first virtual address in a first clock cycle.

11. The microprocessor chip of claim 10, wherein the first level cache memory completes the cache lookup for the first virtual address in a first clock cycle, and wherein the queuing structure signals a first level cache hit/miss for the first virtual address to the second level cache after a second clock cycle.

12. A computer system, comprising:

a microprocessor chip having a processor clock signal, the microprocessor chip comprising:
  a number of execution units;
  an on-chip cache memory, the on-chip cache memory comprising:
    a first level cache having a first address port and a second address port, and wherein the first cache level includes a first translation look aside buffer and a second translation look aside buffer each having a number of entries, and wherein the first translation look aside buffer and the second translation look aside buffer simultaneously receive a first virtual address from the first address port and a second virtual address from the second address port, respectively;
    a second level cache having a first address port and a second address port; and
    a queuing structure coupling the first level cache and the second level cache;
an off-chip memory; and
a bus, wherein the bus connects the off-chip memory to the microprocessor chip.

13. The computer system of claim 12, wherein the second cache level includes a translation look aside buffer having a greater number of entries than the first translation look aside buffer, and wherein the translation look aside buffer simultaneously receive a first virtual address from the first address port and a second virtual address from the second address port.

14. The computer system of claim 12, wherein the first level cache and the second level cache simultaneously initiate a cache lookup for a first virtual address in a first clock cycle.

15. The computer system of claim 14, wherein the first level cache memory delivers a cache hit/miss signal for the first virtual address to the queuing structure after the first clock cycle and the queuing structure delivers the cache hit/miss signal to the second level cache after a second clock cycle.

16. A method for accessing a, cache memory, comprising:
delivering a first virtual address and a second virtual address to a first translation look aside buffer and a second translation look aside buffer in a first level of the cache memory in a first processor clock cycle, each translation look aside buffer having a number of entries;

simultaneously delivering in the first processor clock cycle the first virtual address and the second virtual address to a translation look aside buffer in a second level of the cache memory having a greater number of entries than the first translation look aside buffer; and delivering a first cache hit/miss signal corresponding to the first virtual address through a queuing structure to an arbitrator in the second level of the cache memory after a second processor clock cycle.

17. The method of claim 16, wherein delivering a first cache hit/miss signal corresponding to the first virtual address to the first arbitrator in the second level of the cache memory after a second processor clock cycle further includes simultaneously delivering a second cache hit/miss signal corresponding to the second virtual address through the queuing structure to the arbitrator in the second level of the cache memory.

18. The method of claim 16, wherein the method further includes:
initiating a cache lookup of a first virtual address and a second virtual address in the first level of the cache memory in the first processor clock cycle;
simultaneously initiating a cache lookup of the first virtual address and the second virtual address in the second level of the cache memory in the first processor clock cycle; and
completing the cache lookup of the first virtual address and a second virtual address in the first level of the cache memory in the first processor clock cycle.

19. The method of claim 16, wherein the method further includes:
manipulating a data set representing a cache hit for the first virtual address in the first level of the cache memory in a second processor clock cycle; and
outputting the data set in the second processor clock cycle.

20. The method of claim 19, wherein outputting the data set in the second processor clock cycle includes sending the data set to a register file.

21. The method of claim 16, wherein the method further includes:
manipulating a data set representing a cache hit for the second virtual address in the first level of the cache memory in a second processor clock cycle; and
delivering the data set from the first level of the cache memory to a multiplexor (MUX) and giving routing priority to the data set from the first level of the cache memory and a data set from the second level of the cache memory within the second processor clock cycle.

22. A method for accessing a cache memory, comprising:
initiating a cache lookup of a first virtual address and a second virtual address in an on-chip first level of the cache memory in a first processor clock cycle, wherein the on-chip first cache level includes a first translation look aside buffer and a second translation look aside buffer each having a number of entries, and wherein the first translation look aside buffer and the second translation look aside buffer simultaneously receive the first virtual address and the second virtual address;

initiating, in parallel, a cache lookup of the first virtual address and the second virtual address in an on-chip second level of the cache memory in the first processor clock cycle;

delivering a first cache hit/miss signal corresponding to the first virtual address through a queuing structure to an arbitrator in the on-chip second level of the cache memory after a second processor clock cycle;

completing a cache lookup of the first virtual address in the on-chip second level of cache memory when the first cache hit/miss signal represents a cache miss for the first virtual address in the on-chip first level of the cache memory;

manipulating a data set representing a cache hit for the first virtual address in the on-chip second level of the cache memory; and outputting the data set from the on-chip second level of the cache memory to a multiplexor controlling the routing priority given to a data set from the on-chip first level of the cache memory and the data set from the on-chip second level of the cache memory.

23. The method of claim 22, wherein outputting the data set from the on-chip second level (L1) of the cache memory of the multiplexor further comprises;

giving routing priority to the data set from the on-chip second level of the cache memory over the data set from the on-chip first level (L0) of the cache memory; and forcing the L0 to act as if the L0 had a cache miss for the data set from the L0 and having the L1 perform a cache lookup for the data set from the L0.

24. The method of claim 22, wherein outputting the data set from the on-chip second level (L1) of the cache memory to the multiplexor further comprises:

giving routing priority to the data set from the on-chip second level of the cache memory over the data set from the on-chip first level (L0) of the cache memory; and forcing the L0 to act as if the L0 had a cache miss for the data set from the L0 and having the L1 perform a cache lookup for the data set from the L0.

25. The method of claim 22, wherein manipulating a data set representing a cache hit for the first virtual address in the on-chip second level of the cache memory includes manipulating in parallel a second data set representing a cache hit for the second virtual address in the on-chip second level of the cache memory.

26. The method of claim 22, wherein the method further includes queuing the first virtual address in a queuing structure when a bank conflict arises in the on-chip second level between the first virtual address and the second virtual address.

27. The method of claim 26, wherein queuing the first virtual address in the queuing structure when a bank conflict arises in the on-chip second level between the first virtual address and the second virtual address further includes queuing, in the queuing structure, a first hit/miss signal representing a first level cache miss for the second virtual address in the on-chip first level of cache memory.

28. The method of claim 22, wherein the method further includes manipulating a data set in the on-chip first level of cache memory corresponding to a cache hit for the second virtual address in the on-chip first level of the cache memory in the second clock cycle.

29. The method of claim 22, wherein the method further includes outputting a manipulated data set from on-chip first level through a multiplexor to a functional unit in the second clock cycle.

* * * * *